Aug. 24, 1954 H. E. BRANDT 2,687,051
APPARATUS FOR SECURING LAMINATED ARTICLES TO SUPPORTS
Filed Jan. 19, 1948 7 Sheets-Sheet 2
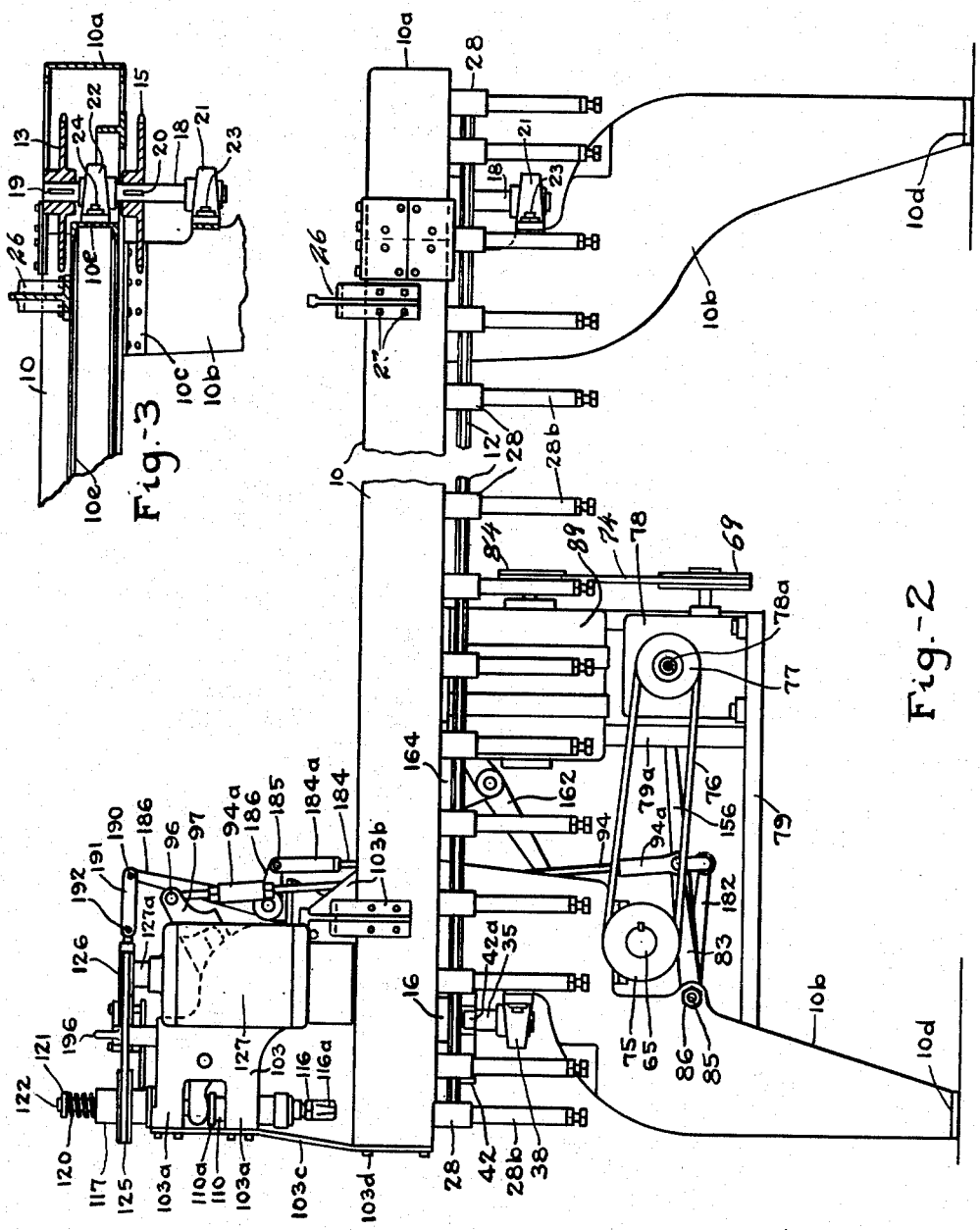
INVENTOR
HENRY E. BRANDT
By Chas. C. Reif
ATTORNEY

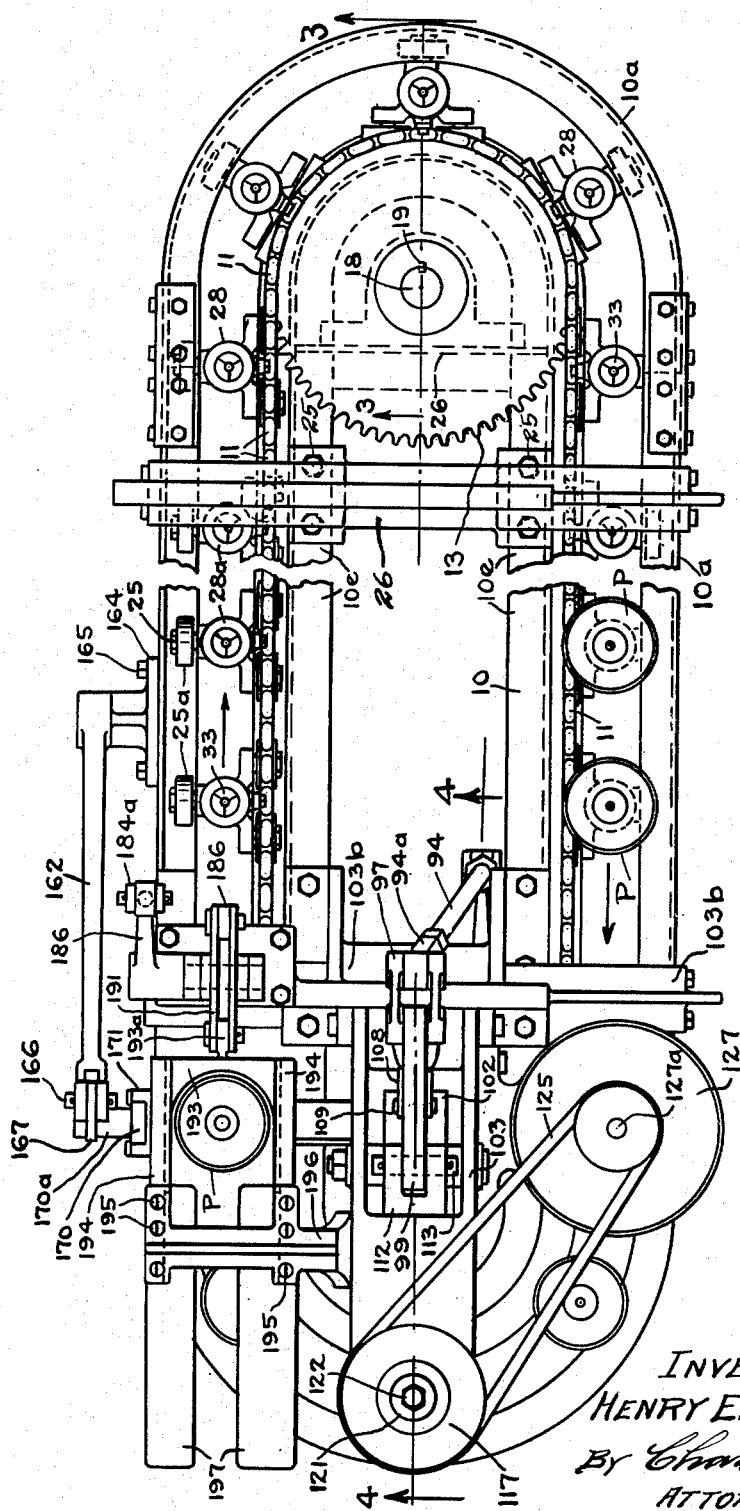

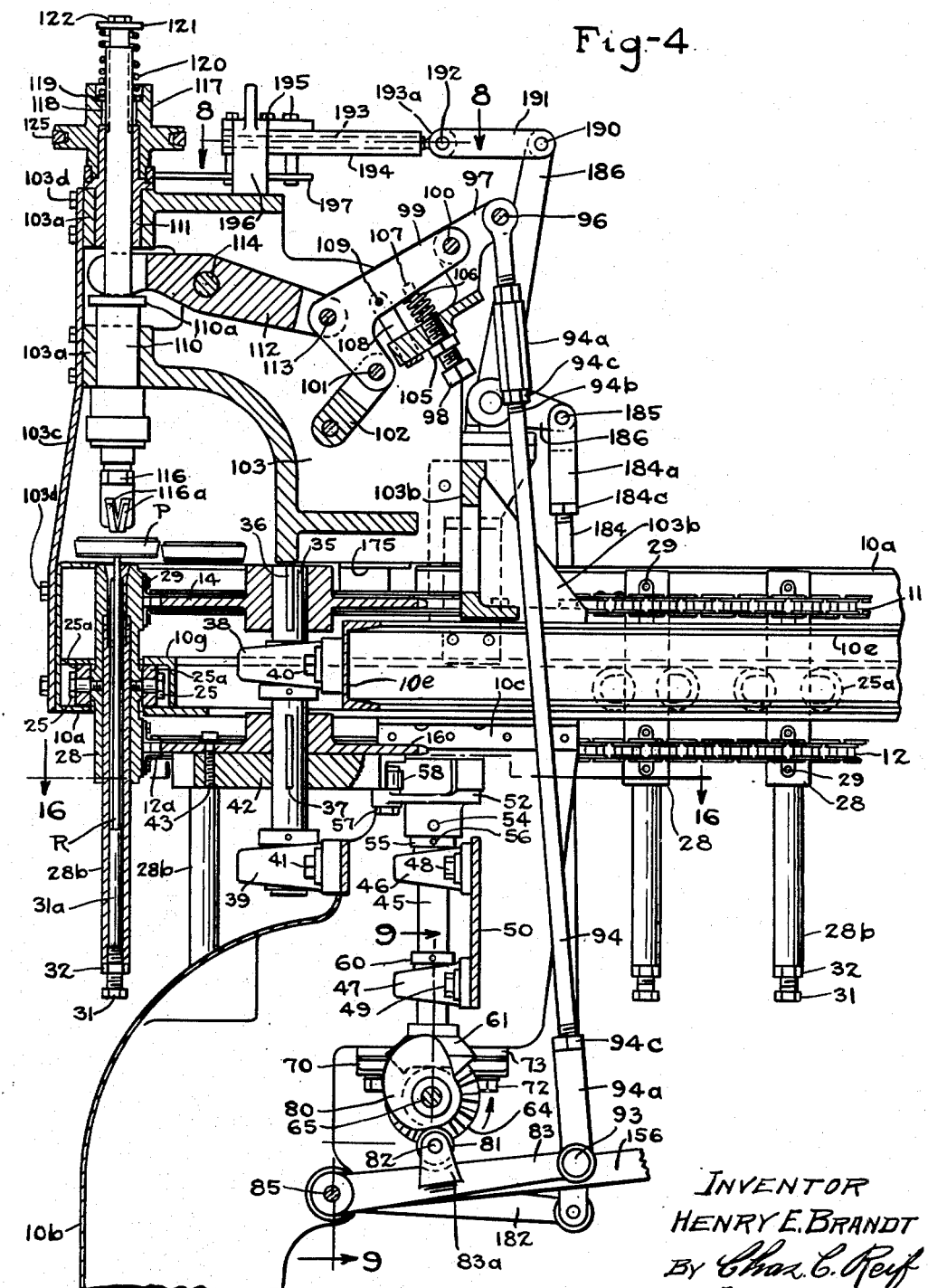

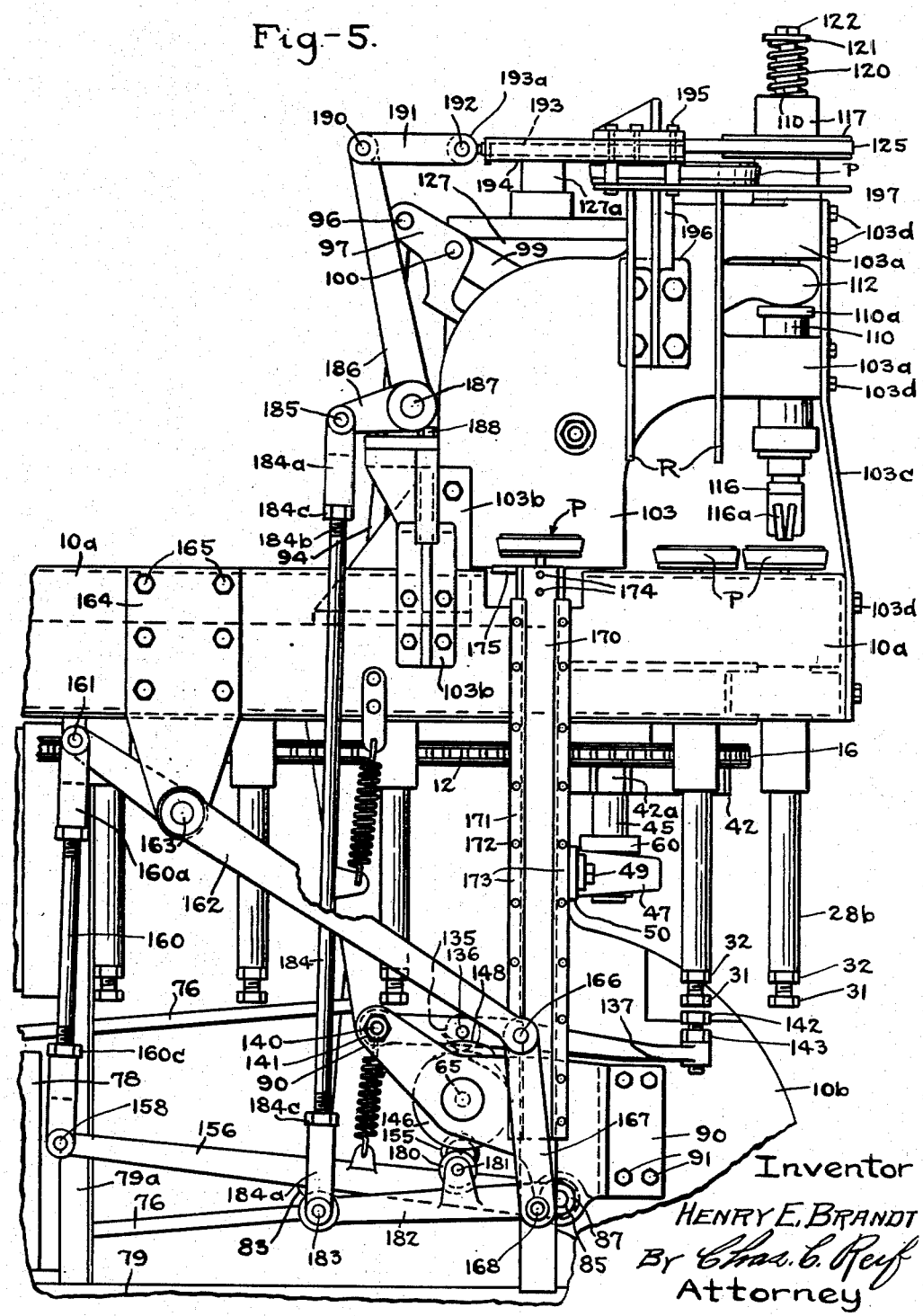

Aug. 24, 1954   H. E. BRANDT   2,687,051
APPARATUS FOR SECURING LAMINATED ARTICLES TO SUPPORTS
Filed Jan. 19, 1948   7 Sheets-Sheet 5
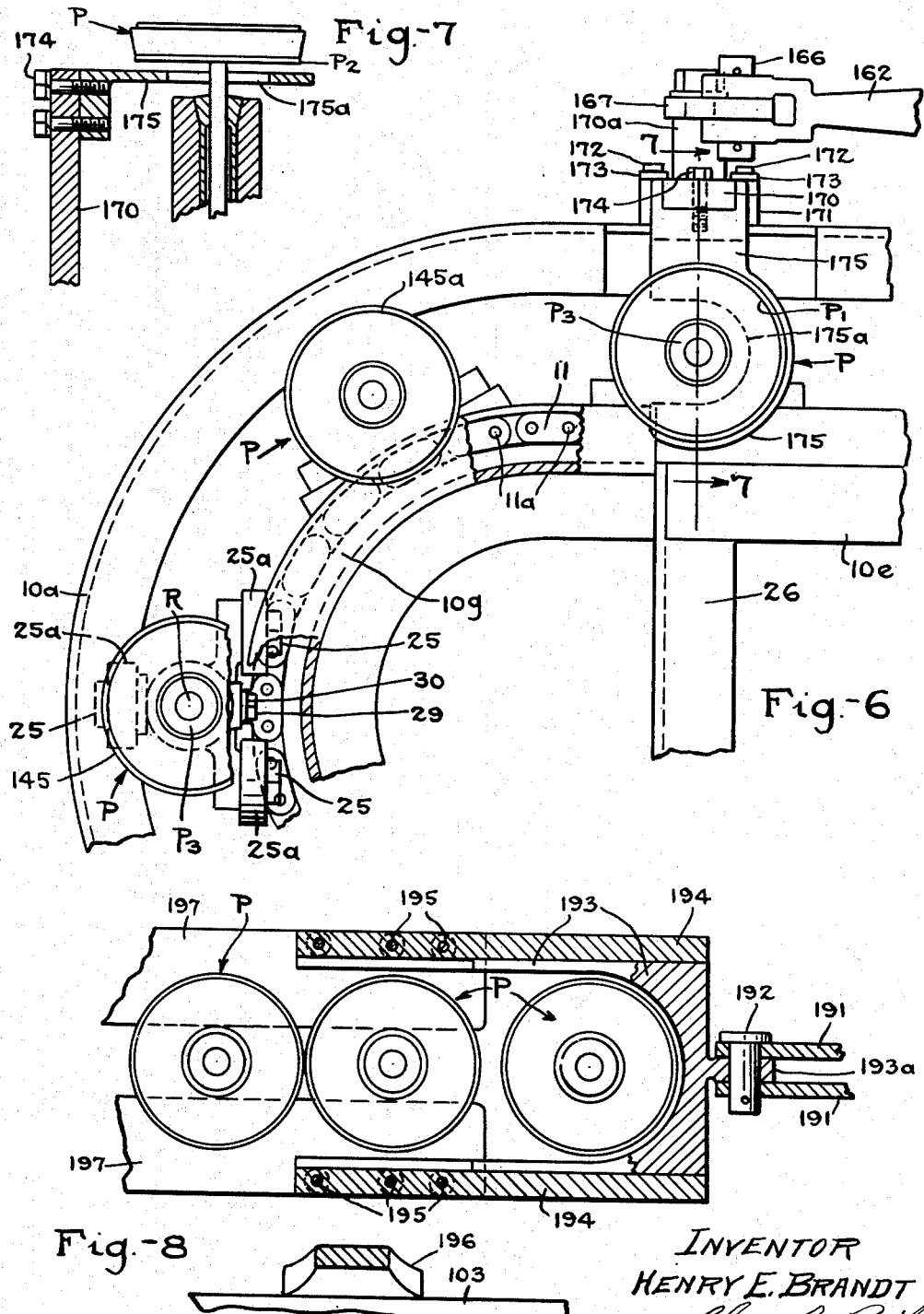
INVENTOR
HENRY E. BRANDT
BY Chas. C. Reif
ATTORNEY

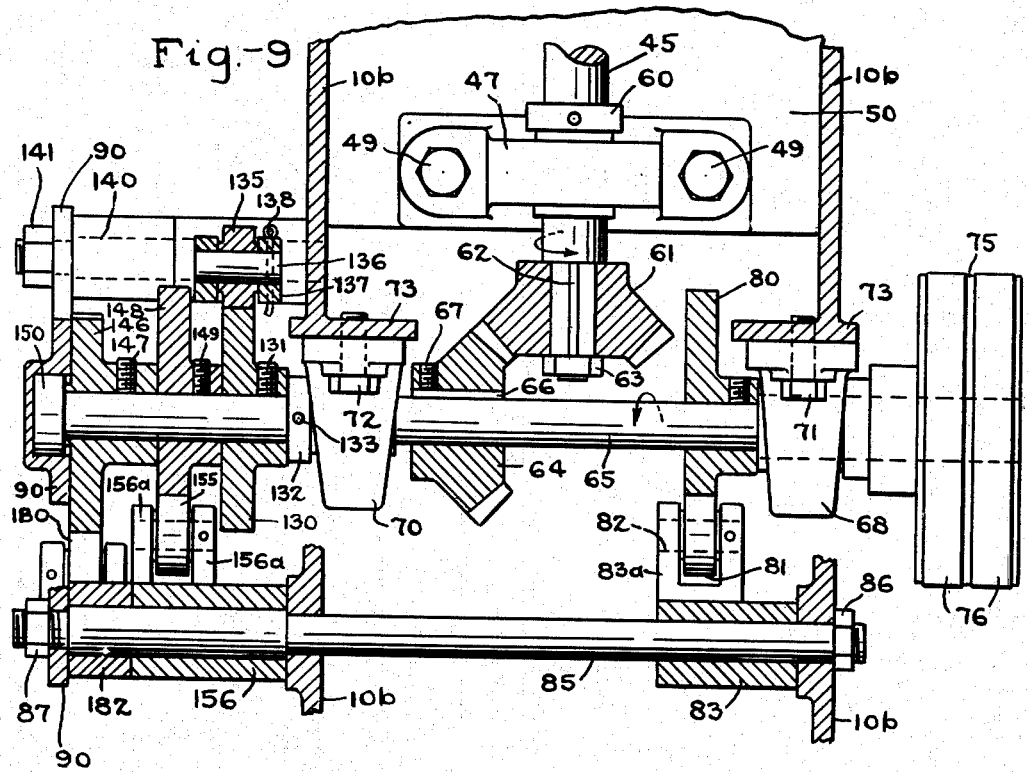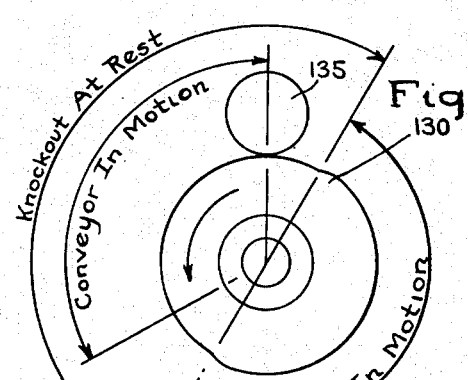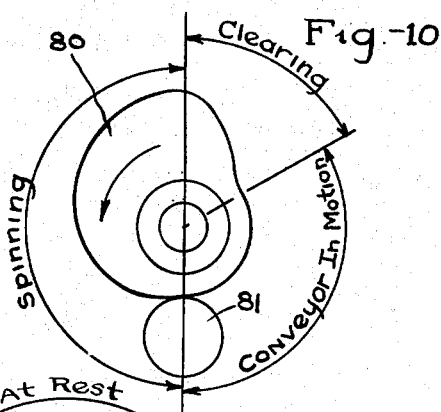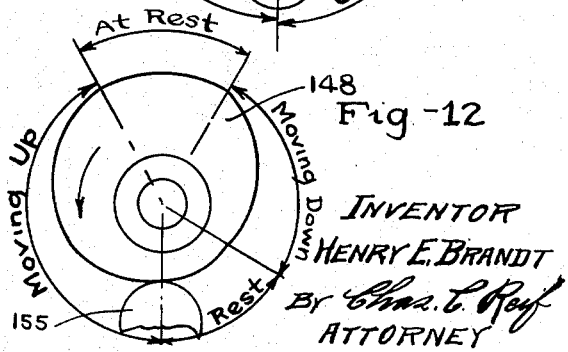

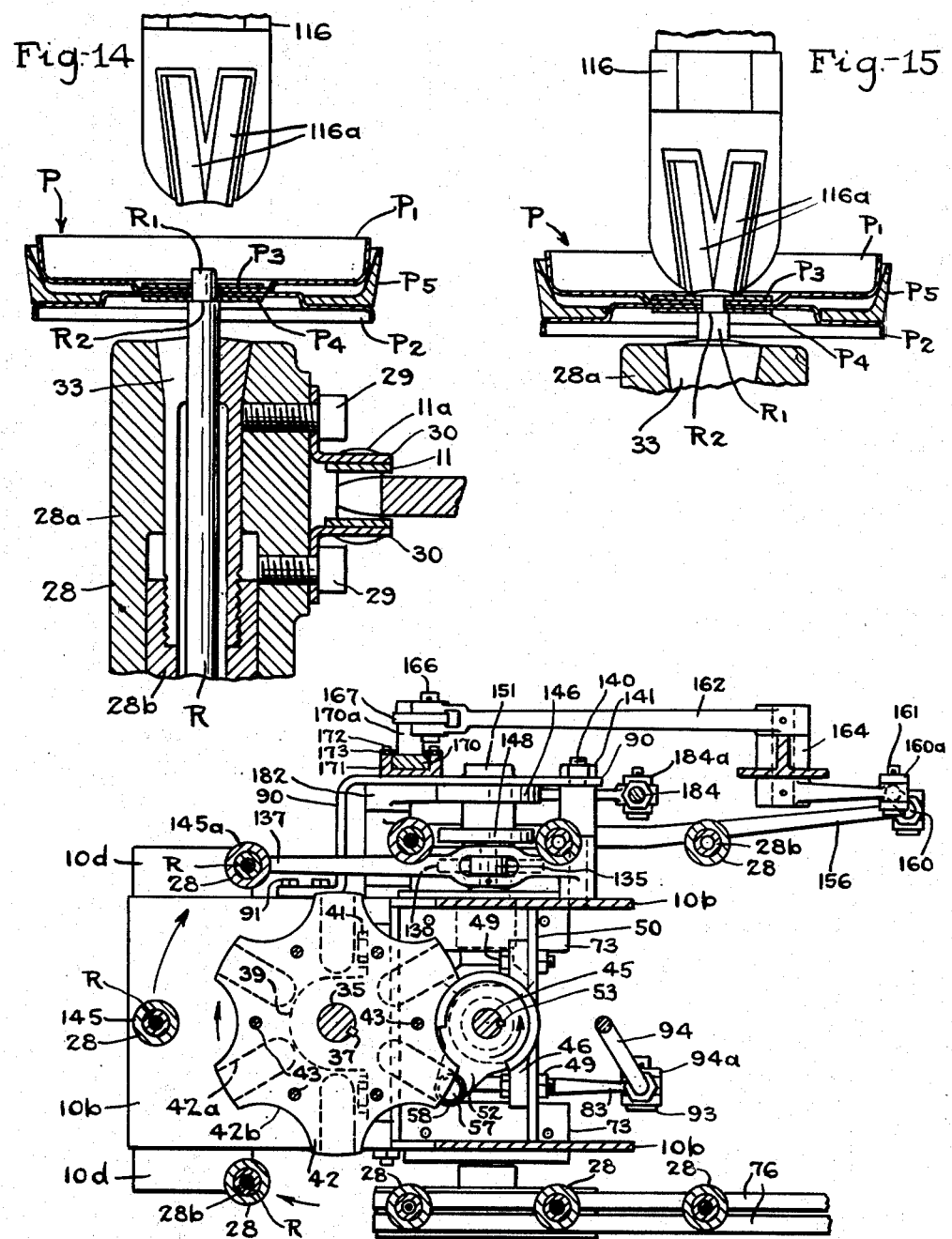

Patented Aug. 24, 1954

2,687,051

UNITED STATES PATENT OFFICE 2,687,051

APPARATUS FOR SECURING LAMINATED ARTICLES TO SUPPORTS

Henry E. Brandt, North St. Paul, Minn.

Application January 19, 1948, Serial No. 3,044

15 Claims. (Cl. 78—49)

This invention relates to a machine for securing an article to a supporting member. While the invention could have many applications and could be used for securing various kinds of articles to different supports, it has been particularly designed to secure an article comprising a plurality of laminations to a supporting member or rod. The specific embodiment of the invention illustrated is constructed and arranged to secure a laminated plunger to a supporting plunger rod, said rod having a portion extending through apertures in said laminations preferably centrally thereof and having a shoulder on which said laminations and plunger are supported.

It is an object of this invention to provide a machine for quickly and efficiently securing a member, preferably a laminated member, to a support.

It is a further object of the invention to provide a machine for efficiently securing a laminated article having an aperture to a support having a portion extending through said aperture and having a portion supporting said article having in combination, means for holding and successively moving a plurality of said supports and articles to different positions and means at successive positions for riveting said first mentioned portion over said article to secure said article to said support, means for removing said support and article from its holder and means for discharging said support and article.

It is a further object of the invention to provide a machine for securing an article preferably of laminated structure and having an aperture therethrough to a support having a portion extending through said aperture having in combination, means for holding and intermittently moving a series of said supports with said articles thereon to bring the same to different positions and means at said different positions for respectively riveting said portion over said article to secure said article to said support, means for removing said supports and articles from said first mentioned means and means for discharging said supports and articles.

It is another object of this invention to provide a machine for efficiently securing a laminated article to a support having a portion extending through an aperture in said article and adapted to be spun or riveted thereover having in combination, an endless carrier holding means for said support and article mounted on said carrier in spaced relation, means for intermittently moving said carrier to bring said holders and said supports and articles to different positions, means at one position for riveting or spinning said portion over said article to secure the same to said support, means at another position for releasing said support from its holding means, means at another position for removing said support and article from its holding means and means for discharging said support and article.

It is still another object of this invention to provide such a machine as set forth in the preceding paragraph in which said means are successively actuated in proper timed relation by mechanisms respectively actuated by cams to a driven cam shaft.

It is more specifically an object of this invention to provide a machine for securing a laminated plunger having an aperture therethrough to a plunger rod having a portion extending through said aperture and a shoulder for supporting said plunger having in combination, a carrier preferably of the endless type, a plurality of holders mounted on said carrier in spaced relation each adapted to receive and hold one of said plunger rods with said plunger thereon, means for intermittently moving said carrier to bring said holders successively to different positions, means at one of said positions for riveting said portion of said rod over said plunger to secure said plunger to said rod, means at another position for releasing said rod from its holder, means at another position for removing said rod and plunger from its holder preferably by an elevating movement, together with means for discharging said rod and plunger.

It is also an object of this invention to provide a novel method of securing laminated articles to supporting members respectively.

These and other objects and advantages of the invention will be fully set forth in the following description made in connection with the accompanying drawings in which like reference characters refer to similar parts throughout the several views and in which:

Fig. 1 is a plan view of the machine embodying this invention;

Fig. 2 is a view in side elevation of said machine;

Fig. 3 is a vertical section taken on line 3—3 of Fig. 1;

Fig. 4 is for the most part a vertical section taken on line 4—4 of Fig. 1, some parts being shown in side elevation;

Fig. 5 is a view in side elevation of certain parts of the machine shown on an enlarged scale;

Fig. 6 is a partial plan view shown on an enlarged scale, some parts being broken away and others shown in horizontal section;

Fig. 7 is a vertical section taken on line 7—7 of Fig. 6;

Fig. 8 is a horizontal section taken substantially on line 8—8 of Fig. 4;

Fig. 9 is a horizontal section taken on line 9—9 of Fig. 4;

Fig. 10 is a diagrammatic plan view of one of the cams used;

Fig. 11 is a diagrammatic plan view of a cam actuating the holder release mechanism;

Fig. 12 is a diagrammatic plan view of the cam actuating the ejector mechanism;

Fig. 13 is a diagrammatic plan view of the cam actuating the transfer mechanism;

Fig. 14 is a vertical section taken substantially on line 14—14 of Fig. 4;

Fig. 15 is a view similar to Fig. 14 showing the parts in a different position; and Fig. 16 is a horizontal section taken on line 16—16 of Fig. 4.

Broadly the present invention comprises a method and apparatus for efficiently handling and securing a plunger rod to a laminated plunger such as is used in the air pump cylinder of sprayers. The invention comprises a rotary riveting head shown in Figs. 4, 14 and 15 which is carried on a spindle 110, which spindle is rotated by a belt 125 running over a pulley secured thereto and over a pulley 126 secured to the driving shaft of a motor 127. See Fig. 2. A carrier is provided, which in the embodiment of the invention illustrated comprises an endless chain 11 which has secured thereto in spaced relation a series of holders comprising members 28 within which are carried respectively collets 33. A casing 28b is movable in each member 28 to which the collet is secured, said member 28 being vertically movable. The laminated plunger P comprising parts P1 to P5 is shown in Fig. 14 and has a central aperture through which a reduced portion R1 of the plunger rod R extends, said plunger seating against the shoulder R2 formed by reduced portion R1. The endless carrier is intermittently moved through the distance between the holders 28 by a Geneva movement comprising a wheel 42 having spaced recesses 42a therein in which a cam roller 58 successively enters. Cam roller 58 is carried on a member 52 secured to a rotatable vertical shaft 45. A driving shaft 65 is provided (see Fig. 9) driven by belts 76 running over a pulley 75 secured to said shaft, said belt being driven by a pulley 77 secured to the driving shaft of a reduction gearing unit 78 which is in turn driven by a belt 74 running over a pulley 69 secured to the driven shaft of said unit and which belt 74 runs over a pulley 84 secured to the driving shaft of a motor 89. (See Fig. 2.) Shaft 45 referred to is driven from shaft 65 through a pair of beveled gears 61 and 64. A series of cams are secured to the shaft 65 and these operate respectively levers for moving spindle 110 downwardly to rivet the portion R1 over the plunger, raising member 28b to release the rod R from the collet 33, to elevate a plate-like member 175 (Fig. 7) to remove the plunger P and rod R from the collet and to operate a slide 193 for moving the plungers and rods laterally at right angles to the axis thereof. These cams and levers are fully described in the following detailed description. They are fully and clearly shown on the drawing and the respective operations thereof are fully and clearly set forth in the description of the operation.

Referring to the drawings, a machine is shown comprising a frame designated generally as 10, which frame has a top portion having a channel member 10a of oblong form the same having semi-circular end portions and intermediate rectilinear and parallel side portions, as shown in Fig. 1. Secured to member 10 in any suitable manner, as by bolts or welding, are end-supporting leg members 10b, as shown in Figs. 1 and 4. Leg members 10b are shown as secured to the channel 10a by angle bars 10c riveted respectively to the sides of members 10b and to the bottom of the flanges of channel member 10a. Leg members 10b have suitable flanges 10d at their bottoms engaging the floor or supporting surface. An endless conveyor is associated with member 10a the same comprising a pair of endless members illustrated as link chains 11 and 12. Chains 11 and 12 are vertically spaced and chain 11 runs over a sprocket 13 at the rear end of the machine and over a sprocket 14 at the front end of the machine. Lower chain 12 runs over a sprocket 15 at the rear end of the machine and over a sprocket 16 at the front end of the machine. Sprockets 13 and 15 are secured to a shaft 18 in any suitable manner, as by the keys 19 and 20 respectively. Shaft 18 is journaled in bearings 21 and 22, bearing 21 being secured by suitable bolts or screws 23 to a rear leg member 10b, as shown in Fig. 3. Bearing member 22 is secured by suitable bolts or screws 24 to a channel member 10e suitably secured to channel member 10a by a U-shaped angle bracket 26 extending over the top of member 10a and secured to the sides thereof by bolts 27. See Figs. 1, 2 and 3. Bracket 26 is secured to channel member 10e by bolts 25. The channel member 10e is also of elongated oblong form and the side and end portions thereof are parallel respectively to the side and end portions of channel 10a. Secured to the chains 11 and 12 in spaced relation and having their axes vertical is a plurality of holding members 28. Each member 28 comprises a substantially cylindrical casing having a flat side adjacent chains 11 and 12 and headed screws 29 extend through angle members 30 securing one flange thereof to said casing, the other flanges of member 30 being connected to the chains 11 and 12 by the link pivots 11a and 12a respectively of said chains, as seen in Figs. 4 and 14. The said casing of holder 28 which is designated 28a is provided with an axial bore in which is disposed a second casing 28b which depends from casing 28a, as shown in Fig. 4 Casing 28b has threaded into its lower end a headed screw 31 having a reduced portion 31a extending upwardly in the central bore of casing 28b and forming an adjustable supporting rod. A lock nut 32 is disposed on screw 31 and engages the lower end of casing 28b. Casing 28b has threaded into its upper end the lower part of a collet 33. Collet 33 is split for a good part of its length to have a plurality of jaws somewhat spaced at their upper ends, the same being shown as three in number, as seen in Fig. 1. The collet 33 and portion 31a form the support for the plunger rod R to which the plunger P is to be secured. It will be seen that the lower end of plunger rod R rests upon the upper end of the portion 31a of screw 31. While the plunger could be variously formed, in the embodiment of the invention illustrated it is shown as comprising an upper cup member P1 and a lower cup member P2. Said members have their cup portions reversely disposed and have engaging central portions, said members preferably being pressed out of sheet metal. Washers P3 and P4 are disposed at the top and bottoms of said cup members and said washers and cup members are provided with a central aperture through which extends a reduced upper end R1 of rod R. Reduced end R1 forms a shoulder R2 on which the parts P1, P2, P3 and P4 which form laminations of the plunger are supported. A cup member P5 of annular form and which will preferably be made of some yielding material, such as leather, is disposed between the cup members P1 and P2. The rods R and the plungers P carried thereon will be placed in the holders 28 by the operator preferably at the rear part of the machine. Secured to each side of casing portion 28a are headed studs 25 on which are journaled rollers 25a. Rollers 25a roll upon the bottom flange of the channel member 10a and a plate 10g overlies rollers 25a the same being secured to channel plate 10a.

The front sprocket wheels 14 and 16 are mounted upon a shaft 35 and secured thereon in any suitable manner, as by the keys 36 and 37. Shaft 35 is journaled in bearings 38 and 39, bearing 38 being secured to the front of channel 10e by suitable bolts or screws 40. Bearing 39 is secured to the front leg member by suitable bolts or screws 41. Secured to shaft 35 immediately below sprocket 16 is a wheel 42 having a plurality of circumferentially spaced radial slots or recesses therein commonly known as the "Geneva" wheel. Wheel 42 is secured to sprocket 16 by a plurality of circumferentially spaced headed screws 43 extending downwardly into wheel 42. Key 37, as shown in Fig. 4, also extends into the wheel 42. A shaft 45 extends vertically and parallel to shaft 35 some distance in the rear thereof, said shaft being supported in vertically spaced bearings 46 and 47 secured by suitable bolts or screws 48 and 49 to a plate or bracket 50 secured to the front leg member 10b. Shaft 45 has secured thereto at its upper end an arm 52 in any suitable manner, as by a key 53, and a set screw 54. A collar 55 is secured to shaft 45 below arm 52 by a suitable set screw 56. Collar 55 rests upon the top of bearing 46. Arm 52 has a hub at its outer end through which extends a headed and nutted stud 57 carrying a roller 58 which rests upon the top of said hub. Roller 58 is adapted to enter into one of the open ended radially extending slots or recesses 42a in the wheel 42, as shown in Fig. 16. Wheel 42 has semi-cylindrical surfaces 42b between the slots 42a and arm 52 is provided with a semi-cylindrical surface at its end adapted to fit in and engage the surfaces 42b. Shaft 45 has a collar 60 secured thereto engaging the top of bearing 47. The lower end of shaft 45 is reduced and has secured thereto in any suitable manner, as by the key 62, a beveled gear 61. The lower end of shaft 45 is threaded and has secured thereon a nut 63. Beveled gear 61 meshes with a similar gear 64 secured to a shaft 65 in any suitable manner, as by the key 66 and set screw 67. Shaft 65 is journaled in bearings 68 and 70 which are secured by the headed screws 71 and 72 respectively to plates 73 secured to the front leg member 10b. Shaft 65 is driven by a pulley 75 secured to one end thereof over which runs one or more belts 76 also running over a pulley 77 secured to the driving shaft 78a of a reduction gearing unit 78. Unit 78 is mounted upon a bracket 79 supported on front leg member 10b and by a vertical member 79a extending to channel member 10a. Unit 78 comprises a pulley 69 over which runs a belt 74 also running over the driving pulley 84 of a motor 89. Shaft 65 has secured thereto a cam 80 (see Figs. 9 and 10). Cam 80 is arranged in alinement with and adapted to engage a roller 81 carried on a pin 82 extending between the arms of a lug 83a projecting upwardly from a lever arm 83 which has a hub journaled on a shaft 85 secured in and extending between projecting lugs on leg member 10b. (See Figs. 4 and 9.) Shaft 65 has reduced threaded ends on which are secured nuts 86 and 87. One end of shaft 85, namely, the left-hand end as seen in Fig. 9, extends through a bracket 90 secured by bolts 91 to the front leg member 10b. (See Fig. 16.) Bracket 90 is engaged by nut 87. Lever 83 is pivoted at one end by a suitable pivot 93 to a link 94 which extends upwardly. Link 94 has socket members 94a at its ends threaded to receive the threaded ends of rod 94b, lock nuts 94c being disposed on rod 94b and engaging the ends of members 94a. The length of link 94 can thus be adjusted. The upper end of link 94 is pivotally connected by a suitable pivot 96 to one end of a member 97 having a plate-like portion or lug threaded to receive a headed screw 98 (see Fig. 4). A bell crank lever 99 is pivotally connected intermediate the ends of 97 by a pivot 100. Bell crank lever 99 is pivotally connected at the end of its other arm by a pivot 101 to the bifurcated end of a link 102, which link is pivoted at its other end to a frame member 103. Member 97 is bored and threaded to receive a headed screw 98 equipped with a lock nut 105 engaging the side of member 97. Screw 98 has a reduced end extending into a compression spring 106 which is disposed between member 97 and the long arm of bell crank lever 99. A pin 107 is secured in the side of said long arm and extends into the upper end of spring 106. A yoke 108 is pivoted to said long arm by a pin 109 and extends around one end of the lower portion of member 97 to limit its movement relative to bell crank lever 99. The frame member 103 extends upwardly from the channels 10a and is secured to said channel in any suitable manner, as by the brackets 103b (see Fig. 2). Frame 103 is also supported at its front end by a bracket 103c secured to the bearing portions 103a and to channel 10a by headed screws 103d. Said head has a front portion comprising spaced bearings 103a in which is journaled a spindle 110. A bushing 111 is secured in the top bearing 103a, the same having a flange overlying said bearing and extending some distance above said flange. The upper end of spindle 110 is reduced and journaled in bushing 111. Spindle 110 has a collar 110a thereon some distance above lower bearing 103a, as shown in Fig. 4, and the portion of spindle 110 just above said collar is engaged by the forked end of a lever arm 112, which lever arm is pivoted to the intermediate portion of bell crank lever 99 by a pivot 113. Lever 112 is pivoted intermediate its ends on a stud or shaft 114 extending between the sides of frame member 103. The lower end of spindle 110 comprises a socket in which is secured a member 116 having spinning or riveting jaws 116a at its lower end, as shown in Figs. 14 and 15. A pulley 117 is journaled on the upper end of bushing 111 and secured to spindle 110 by the keys 118. A steel washer 119 is disposed in the upper end of pulley 117 and is engaged by the lower end of a coiled compression spring 120 the upper end of which is engaged by a collar or washer 121 secured on the upper threaded end of spindle 110 and engaged by a nut 122 threaded on said upper end. Pulley 117 is provided with a peripheral groove of V or trapezoidal shape in which runs a belt 125 which also runs over a pulley 126 having a peripheral groove similar to that of pulley 117 and which is secured to the armature shaft 127a of a motor 127 secured to the side of frame 103. It will be seen that spring 120 urges spindle 110 upwardly and that said spindle can be moved downwardly by action of lever 112 which will be in turn moved by bell crank lever 99 and member 97. Member 97 will be moved downwardly by lever 83 which in turn will be actuated from cam 80. In one cycle of the machine therefore the riveting head or jaws 116a is moved downwardly to rivet the portion R1 over the laminations of the plunger P, as shown in Fig. 15. This riveting is done with a rotating motion of members 116a so that portion R1 is spun over the top washer P3.

A cam 130 is secured to shaft 65 in any suitable manner as by the set screw 131. A collar 132 is secured to shaft 65 by a set screw 133 and engages one end of cam 130. Cam 130 has its periphery in engagement with a roller 135 (see Figs. 9 and 11). Roller 135 is journaled on a short shaft 136 carried between the sides of a lever 137 and held in place by a cotterpin 138. Lever 137 has an opening therein, as shown in Fig. 16, in which roller 135 is disposed. Lever 137 has a hub at one end journaled on a shaft or stud 140 extending through bracket 90 and having a reduced end on which is threaded a nut 141. Lever 137 has a hub at its free end having a vertical bore therein and in which is threaded a headed screw 142, said screw being provided with a lock nut 143 which engages the hub on lever 137. The screw 142 is disposed in vertical and axial alinement with the screw 31 on one of the holders 28 when in a certain position on the chains 11 and 12, which position is indicated at 145a in Fig. 16. In one cycle of the machine therefore lever 137 will be actuated by cam 130 and its free end will move upwardly and engage the screw 31 to raise the sleeve 28 and the collet 33.

A cam 146 is secured to shaft 65 in any suitable manner, as by a set screw 147, said cam engaging at one end another cam 148 secured to shaft 65 by a set screw 149. Cam 148 in turn engages cam 130. Cam 146 at its other end engages a ball bearing 150 on shaft 65 disposed in a bore in bracket 90. Cam 148 has a periphery engaging a roller 155 journaled on a stud secured in spaced lugs 156a of a lever 156. Lever 156 has a hub at its larger end journaled on shaft 65. The other end of lever 156 has a hub pivotally connected by pivot 158 to a link 160. Link 160 is pivotally connected at its other end by a pivot 161 to a lever 162. Link 160 comprises end socket members 160a in which the ends of an intermediate rod are threaded, said rod being provided with lock nuts 160c engaging the ends of members 160a respectively. Lever 162 is pivoted intermediate its ends on a stud 163 secured in the lower end of a bracket 164 secured by suitable screws 165 to channel 10a. The other end of lever 162 is pivotally connected by a pivot 166 to a link 167, which link is pivotally connected at its other end by a pivot 168 to a portion 170a projecting from a slide 170 which is slidable in a guide member 171 secured by spaced screws 172 to the side of channel 10 and to the bracket 90. Slide 170 is of rectangular form in cross section and is held in place by retaining strips 173 through which screws 172 also pass. Slide 170 has connected thereto at its upper end by spaced headed screws 174 a bracket 175. Bracket 175 underlies the plunger P and is engaged by portion P2 thereof, said bracket having an aperture 175a therethrough in axial alinement with collet 33. In one cycle of the machine therefore, which cycle follows the cycle in which the holder is elevated, cam 148 will actuate lever 156 which in turn through link 160 will actuate lever 162 to elevate slide 170 and thus by bracket 175 elevating the plunger P and the plunger rod R, as shown in Figs. 4, 5 and 7.

Cam 146 engages a cam roller 180 (see Figs. 5, 9 and 13), which roller is mounted on a shaft or stud 181 mounted in spaced lugs extending upwardly intermediate the ends of a lever 182. Lever 182 has a hub at its larger end journaled on shaft 85 and has a hub at its other end pivotally connected by a pivot 183 to a link 184. The other end of link 184 is pivotally connected by pivot 185 to the short arm of a bell crank lever 186. Link 184 comprises end socket members 184a into which the ends of the rod 184b are threaded, said rod having lock nuts 184c engaging the ends of members 184a. Link 184 can thus be adjusted in length. Bell crank lever 186 is pivoted on a stud 187 secured in a bracket mounted on the upper end of one of the brackets 103b and fastened by screws 188. The upper and long arm of bell crank lever 186 is pivotally connected by a pivot 190 to one end of a link 191, which link is pivotally connected at its other end by a pivot 192 to a slide 193. Link 191 comprises spaced portions disposed at either side of the hub at the upper end of bell crank lever 186 and the hub 193a secured to one end of slide 193 (see Figs. 1, 4, 5 and 8). Slide 193 reciprocates in a guide 194 secured by screws 195 to a bracket 196 which is in turn secured to one side of housing 103. Spaced supporting plates 197 extend horizontally from the end of guide 194, as shown in Figs. 1 and 8. The end of slide 193 opposite the hub 193a is of semi-cylindrical form and in the position shown in Fig. 8 is concentric with the circumference of the plunger P. When the plunger P and the rod R have been elevated as previously described, the plunger is brought into horizontal alinement with slide 193 and when cam 146 actuates lever 182 said slide is reciprocated through link 184 and bell crank lever 186, the same being moved to the right, as shown in Fig. 5, and to the left, as shown in Fig. 8. The plunger and its rod is moved horizontally and laterally and the plunger moves to a position on the plates 197 and rests thereon, as shown in Figs. 5 and 8. The completed and assembled plungers and rods can be taken from plates 197 by the operator.

The operation which has been briefly outlined above is as follows: The plunger rod R with the plunger loosely assembled thereon, as shown in Figs. 14 and 15, is placed in the holders 28 by the operator at the rear end of the machine. The chains 11 and 12 are intermittently moved by the Geneva wheel 42 and the arm 52. Motor 78 will be operated and shaft 65 will be driven. Shaft 45 will be driven through beveled gears 61 and 64 and arm 52 will be rotated at constant and uniform speed in the direction indicated by the arrow in Fig. 16. In each revolution the roller 58 at one end of arm 52 will enter one of the slots or recesses 42a and will turn the wheel 42 through sixty degrees. The roller leaves the slot after wheel 42 has been turned to such an extent. One of the rods and plungers has now been brought to the position 145 shown in Fig. 16. At this time while the chains 11 and 12 are at rest, cam 80 operates and the spindle 110 is depressed through action of lever 83, link 94 and members 97, 99 and 112. The spinning head or jaws 116a are now brought down against portion R1 of the rod R and said portion is riveted over the top washer P3 and the parts of the plunger are pressed into very firm engagement. Head or jaws 116a are rotating and the portion R1 is riveted with a spinning action. It will be seen that the pressure on spindle 110 is produced with a yielding action due to the spring 106 disposed between members 97 and 99. The tension on this spring can be regulated by screw 104. The yoke 108 limits the movement of the lower portion of member 97 away from member 99. When the low part of cam 80 engages roller 81, spindle 110 is again elevated by spring 120. The cycle of action of cam 80 is indicated in Fig. 10. Arm 52 now engages another one of the recesses 42a and the conveyor carried by chains 11 and 12 is moved another step and the riveted rod and plunger are now moved to position 145a, as shown in Fig. 16. It will be understood that as chains 11 and 12 are progressed, the members 28 are carried along and supported by the rollers 25a. With the rod R and plunger P in position 145a and in the condition shown in Fig. 15, cam 130 now engages roller 135 and lever 137 is swung upwardly bringing the head of screw 142 into engagement with the head of screw 31 and this elevates portion 28b of the holder so that the collet 33 is pushed upwardly. From Fig. 14 it will be seen that portion 28b can move upwardly in the space shown in casing 28a. This upward movement of the collet loosens the same so that the rod R is not now gripped in said collet. Cam 130 could be called a knockout cam and its cycle of movement is indicated in Fig. 11. Wheel 42 is now moved through another sixty degrees and the rod and plunger operated upon are brought to the position 145b, as seen in Fig. 16. At this time and while the conveyor is stationary, cam 148 engages its roller 155 so that lever 156 is depressed and the end of lever 162 connected to the slide 170 is elevated by link 160. Slide 170 is now elevated and the bracket or plate 175 is elevated carrying with it the plunger P and the rod R. The plunger is elevated to be in alinement with slide 193. While the plunger is in alinement with slide 193, cam 146 acts on its roller 180 and slide 193 is moved through link 184 and bell crank lever 186 so that slide 193 engages the plunger and moves the same onto the plates 197 so that it is supported on said plates with the rod R depending between said plates, as shown in Fig. 5. Slide 170 is now lowered and slide 193 again moved to the left, as shown in Fig. 5. The cycles of cams 146 and 148 are indicated in Figs. 13 and 12 respectively. The rod R with the plunger P riveted securely thereto can now be taken off the plates 197 by the operator or said plungers and rods can be pushed off of said plates and received in any desired means. The action is continued with the rods and plungers being riveted together, released in the collet, elevated and transferred to the plates 197 in successive operations.

From the above description it will be seen that I have produced a method and apparatus by which the plungers can be effectively secured to the rods in a rapid and efficient manner. All the operator has to do is place the assembled rod and plunger in the holders 28. The machine acts automatically to progress the rods and plungers, secure the same together and deliver them. The machine has been amply demonstrated in actual practice and found to be very successful and efficient. The same is being used to produce assembled rods and plungers which are used in devices marketed commercially.

It will of course be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. A machine for securing a laminated article to a support having in combination, a plurality of holders respectively engaging said supports, an endless articulated carrier on which said holders are mounted in spaced relation, means for intermittently moving said carrier to bring said holders successively to different positions, means at one position for riveting said articles to said supports, a plate-like member at another position over which said articles are successively moved, said member having an opening through which said support depends, means for elevating said member for removing said articles and supports from their respective holders, and means for moving said articles and supports laterally after they have been so removed from their holders.

2. A machine for securing a laminated article to a support having in combination, a plurality of holders for said articles and supports having means for gripping said support, an endless articulated carrier on which said holders are mounted in spaced relation, means for intermittently moving said carrier to bring said holders successively to different positions, means at one position for riveting said laminations to said support, means at another position for releasing said gripping means to release said support from its holder, means at another position for removing said support and article from said holder and means for subsequently discharging said support and article onto a supporting surface.

3. A machine for securing a laminated article to a central support, said support having a portion extending through said article and a shoulder on which said article is supported having in combination, an endless articulated carrier means for said support and article means for intermittently moving said carrier spaced holders on said carrier in which said supports are respectively placed to bring said support and article successively to different positions, means at one position for pressing said laminations against said shoulder and riveting said portion over said laminations, means at another position for moving said holders to release said support means at another position for removing said support and article from said carrier means and means for discharging said article and support.

4. A machine for securing an article having a plurality of laminations to a support having a portion extending through said laminations and forming a shoulder on which said article is supported having in combination, an endless articulated carrier, spaced holders on said carrier for respectively receiving and gripping said supports, means for intermittently moving said carrier to bring said holders and said articles and supports successively to different positions, means at one position for pressing said laminations against said shoulder and riveting said portion over the same, means at another position for releasing said supports in said holders, means at another position for removing said support and article from its holder and means subsequently for discharging said support and article.

5. A machine for securing a laminated article to a support which has a portion extending through said laminations and a shoulder on which said laminations are supported having in combination, an endless articulated carrier, a series of spaced holders on said carrier each adapted to receive and grip one of said supports with said article thereon, means for intermittently moving said carrier to bring said holders and supports and articles successively to different positions, means at one position for spinning said portion over said laminations to secure said article to said support, means at another position for releasing said support from its holder, means at another position for removing said support from its holder and means for subsequently discharging said support and article.

6. A machine for securing an article to a support having in combination, means for holding and intermittently moving said support with said article thereon to different positions, means at one position for riveting a portion of said support over said article to secure said article to said support, means at another position for removing said support and article from said first mentioned means by lifting said article and support and means movable transversely of said support for moving and discharging said article and support while so lifted.

7. A machine for securing an article having a plurality of laminations to a support having a portion extending through said laminations and a shoulder on which said laminations are supported having in combination, a series of spaced holding means for said supports, an endless chain carrier on which said means are mounted in spaced relation, spaced sprockets for said carrier, shafts carrying said sprockets, one of which shafts is driven, means for intermittently driving said latter shaft for moving said carrier to bring said holding means, supports and articles successively to different positions, a driven rotating spindle at one of said positions, said spindle and one of said holding means and said support being brought into axial alignment at said position, means for moving said spindle downwardly for spinning said portion over said laminations of said article and riveting the same to said support, means at another position for removing said support and article from its holding means and supporting the same and means for moving said support and article from said last mentioned means to discharge the same.

8. A machine for securing an article having a plurality of laminations to a support having a portion extending through said laminations and having a shoulder on which said laminations are supported having in combination, an endless articulated carrier, a series of holding means mounted in spaced relation on said carrier and adapted to receive and grip said support with said article thereon and adapted to be brought respectively to different positions by said carrier, a driven rotatable spindle having a riveting and spinning means at its end, one of said supporting means being brought into axial alignment with said spindle in one position, cam operated means for moving said riveting and spinning means downwardly to spin and rivet said portion over said laminations and against said shoulder to secure said article to said support, means at another position for releasing and removing said support from said holding means and means for discharging said support and article.

9. A device for securing a laminated article to a rod having in combination, an endless articulated track, an endless conveyor movable adjacent said track, a series of spaced holders carried by said conveyor for respectively carrying said articles and rods in definite relation to said conveyor, means for intermittently moving said conveyor a distance equal to the spaces between said holders to bring said holders successively to different positions, a riveting mechanism at one of said positions, means for operating said riveting mechanism to rivet said article to said rod, a work releasing means at another of said positions, means for operating said work releasing means to release said rod and article from its holder, a work elevating mechanism at another of said positions, means for operating said work elevating mans to elevate said rod and article at said latter position, and means for discharging said rod and article from said elevating means.

10. The structure set forth in claim 9, a cam shaft, a series of cams on said cam shaft and actuating means connected respectively to said riveting mechanism, releasing means and elevating means engaged successively by said cams for causing operation of said riveting mechanism, releasing means and elevating means.

11. A device for connecting a laminted article and rod having in combination, an endless articulated carrier, holders mounted on said carrier in spaced relation, each of said holders comprising a clamping collet, said rods with said articles thereon being mounted in said holders respectively and clamped in said collets, a riveting mechanism, a releasing mechanism and an elevating mechanism, means for moving said carrier to bring each of said collets successively into alignment with said riveting mechanism, said releasing mechanism and said elevating mechanism, and means for operating said riveting mechanism, said releasing mechanism and said elevating mechanism while said collet is aligned therewith to successively rivet said rod to said article, release said rod from said collet and to elevate said rod and article from said collet.

12. The structure set forth in claim 11, and means for removing said rod and article from said elevating means while in elevated position.

13. The structure set forth in claim 1, and removable means for moving said article and support laterally while so elevated to discharge said article and support.

14. An apparatus for securing a laminated plunger to a plunger rod having a reduced terminal portion thereon forming a shoulder, said plunger being supported on said portion and engaging said shoulder, a holder having means for gripping and supporting said rod with said plunger thereon, means for moving said holder, plunger and rod to one position, a riveting member into alinement with which said holder, plunger and rod are brought at said position, means for relatively moving said holder and riveting member to rivet said portion over said plunger to press said laminations together and secure said plunger to said rod, said first mentioned means acting to move said rod and plunger to a second position, means for releasing said rod from said holder at said second position, said first mentioned means acting to move said rod and plunger to a third position, and means for removing said rod and plunger from said holder at said third position.

15. A machine for securing a laminated article to a support having in combination, an endless member movable through a closed path, a plurality of spaced carrier means on said member each adapted to support and hold in definite position in relation to said member one of said supports and the laminated article therein, means for intermittently moving said member equal distances equal to the distance between said carriers to bring said carriers to different positions, means at one position of said member for riveting said support to said article, a plate-like member at another position over which said article is moved and through which said support depends, and means for raising said plate-like member with said article and support to remove said article and support from its carrier.

References Cited in the file of this patent

UNITED STATES PATENTS

| Number | Name | Date |
|---|---|---|
| 565,568 | Rhodes | Aug. 11, 1896 |
| 980,216 | Devine | Jan. 3, 1911 |
| 985,838 | Rietzel | Mar. 7, 1911 |
| 1,034,480 | Meadowcroft | Aug. 6, 1912 |
| 1,333,006 | Welser | Mar. 9, 1920 |
| 1,381,809 | Davis | June 14, 1921 |
| 1,484,579 | Still | Feb. 19, 1924 |
| 1,511,822 | Belcher | Oct. 14, 1924 |
| 1,540,021 | Knight | June 2, 1925 |
| 1,554,196 | Bernard | Sept. 22, 1925 |
| 1,649,334 | Belcher | Nov. 15, 1927 |
| 1,702,750 | Stumpf | Feb. 19, 1929 |
| 1,791,505 | Knoth | Feb. 10, 1931 |
| 2,249,964 | Tinder | July 22, 1941 |
| 2,317,425 | Wetzler | Apr. 27, 1943 |
| 2,342,337 | Hallead | Feb. 22, 1944 |
| 2,356,540 | Schwinn | Aug. 22, 1944 |
| 2,461,106 | Brandt | Feb. 8, 1949 |
| 2,464,656 | Sasgen | Mar. 15, 1949 |
| 2,540,117 | Hunt | Feb. 6, 1951 |
| 2,577,594 | Taylor | Dec. 4, 1951 |